May 24, 1960   R. E. WARD, JR., ET AL   2,937,566
STRIP FILM AND VIEWER
Filed May 13, 1957

INVENTORS
ROBERT E. WARD, JR.
JOAN M. WARD
BY
ATTORNEY

United States Patent Office 2,937,566
Patented May 24, 1960

2,937,566

STRIP FILM AND VIEWER

Robert E. Ward, Jr., and Joan M. Ward, both of 7881 Niagara St., Derby, Colo.

Filed May 13, 1957, Ser. No. 658,692

1 Claim. (Cl. 88—19)

This invention relates to amusement devices and, more particularly, to a strip film and viewer.

Most people, especially children, find it very amusing to watch animated pictures; however, moving pictures provide about the only available source of this type of entertainment. Relatively few families, including those having cameras and projectors, have animated films and cartoons that can be shown in the home.

Several attempts have already been made to design a practical, yet inexpensive, strip film and viewer that could be purchased and used by children so that they might take advantage of the many pleasurable hours such a device would afford. Most of these devices, however, have been expensive and too complicated to load and operate for the average child. Also, the films are expensive making them difficult for a child to afford or at least to purchase a sufficient variety to keep them amused. Others are battery-operated and, therefore, too bulky for a child to carry around conveniently. Finally, the prior art film strips have been delicate, easily scratched and torn.

It is, therefore, the principal object of the present invention to provide a film strip and viewer which is especially suited for use in showing animated pictures.

A second object of the invention is the provision of a film strip and viewing device for use therewith that is quite inexpensive and, therefore, ideal as a give-away item or one that can be purchased by children.

A third object is to provide a film strip that is simple to manufacture and can even be made up by the children themselves with their own ideas for animated characters.

Another object is the provision of a novel and improved folded film strip having a special edge construction.

A further object is to provide a viewer which is extremely compact, lightweight and simple to load.

Additional objects of the invention are the provision of a film strip and viewer that are easily operated by even small children, require no source of power other than a pull on the film, and which are decorative in appearance.

Other objects will be in part apparent and in part pointed out specifically hereinafter in connection with the description of the drawing that follows, in which.

Figure 1:
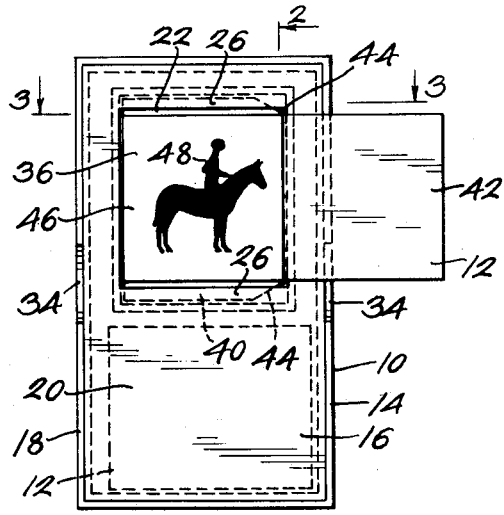
Figure 1 is a front elevation of the film strip and viewer that form the subject matter of the present invention.
Figure 2:
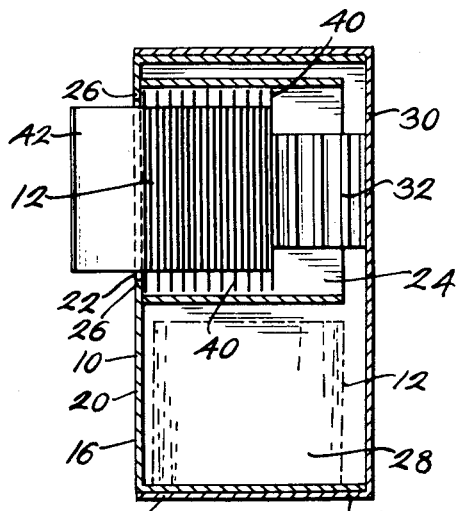
Figure 2 is a section taken along line 2—2 of Figure 1.
Figure 3:
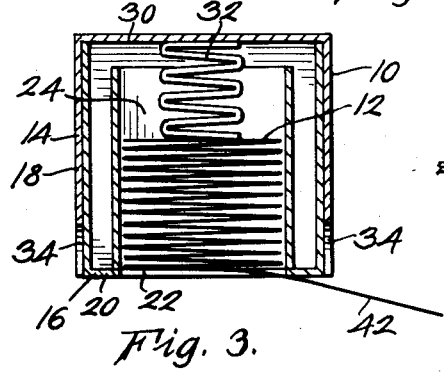
Figure 3 is a section taken along line 3—3 of Figure 1.

Referring now to the drawing, and in particular to Figures 1, 2 and 3 thereof, it will be seen that the present invention comprises a viewer, indicated by numeral 10, and a strip film 12 exhibited therein. In the specific form of the viewer 10 illustrated herein, it comprises a small substantially rectangular box 14 having inner and outer telescoping sections 16 and 18, respectively, which can be interchanged with one another insofar as the present invention is concerned. The front panel 20 of the inner section is provided with a substantially rectangular aperture 22 through which the film strip is viewed. In position surrounding the aperture 22 and extending inwardly therefrom is a magazine 24 in which the film strip 12 is housed. By full lines in Figures 2 and 3 and dotted lines in Figure 1 it will be seen that the front panel 20 extends slightly across the front of the magazine along at least two opposite side edges of the aperture as indicated by numeral 26; whereas, the other edges of the aperture coincide substantially with the walls of the magazine. The magazine and aperture are preferably located in the upper portion of the inner section, as shown, so that a compartment 28 is provided therein for the storage of extra film strips that have been indicated by dotted lines in Figures 1 and 2.

The inner end of the magazine 24 is open and faces the back 30 of outer section 18 as will be clearly seen from an examination of Figures 2 and 3. A compression spring 32 is attached to the back 30 and projects inwardly into the magazine through the open inner end thereof. Conventional cut-outs 34 may be provided in the sides of the outer section along the front edges thereof so that the inner section can be grasped with the fingers and removed therefrom for loading the film strip into the open inner end of the magazine.

At this point it would be well to note that each and every element of the viewer can be made of lightweight cardboard including spring 32 which, in the form shown comprises merely a strip of cardboard bent into a pleated form. This, of course, makes the entire viewer extremely inexpensive and easy to manufacture. Further, insofar as functionability is concerned, the viewer may comprise only the rectangular magazine 24 having the viewing aperture 22 in one end and the spring 32 mounted in the other end extending toward the aperture. The larger box construction illustrated is, however, preferred both for ease in handling and for convenience in loading and storage of spare film strips.

Figure 5:
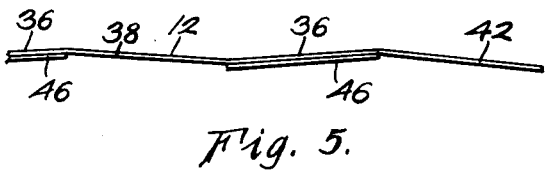
Figure 5 is a top plan view of the film strip in extended position.
Figure 4:
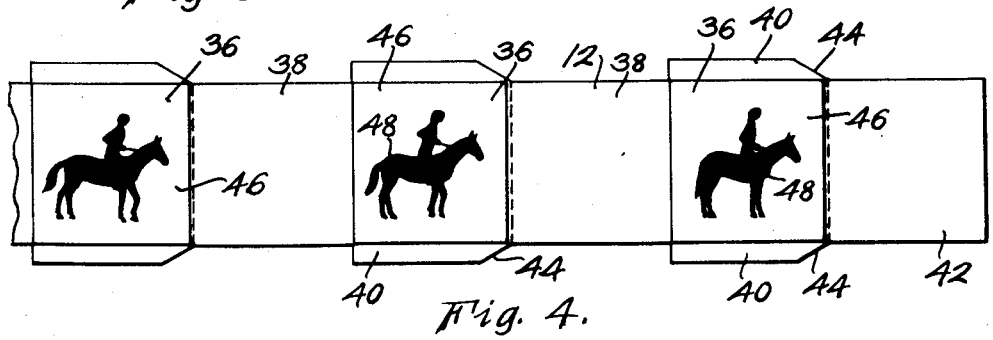
Figure 4 is a fragmentary front elevation showing the film strip extended.

Now, with reference to Figures 4 and 5, the film strip 12 will be described. It will be seen to comprise an elongated strip folded into accordion-pleated fashion to provide alternate picture frames 36 and intermediate frames 38 therebetween. The frames 36 and 38 are of substantially the same size and shape except that the picture frames are each provided with tabs 40 along both free edges thereof. The first frame of the strip forms a pull tab 42. Also, the leading edges 44 of each tab 40 nearest the end of the strip having pull tab 42, are cut on the bias to remove the corners thereof for the purpose to be set forth as the description proceeds. In the specific form of the film strip shown, it will be seen that a plurality of pictures 46 containing animated drawings 48 in progressively different positions are mounted on the picture frames beginning at the first frame and working on through to the last. As illustrated in Figures 4 and 5, the pictures 46 are separate from the picture frames and fastened thereon by a suitable adhesive. Obviously, the drawings 48 may be applied directly to the film strip instead of mounting pictures 46 thereon.

Figure 6:
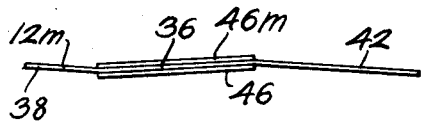
Figure 6 is a view similar to Figure 5 showing a slightly modified form of film strip.

The slightly modified film strip 12m of Figure 6 is the same as that of Figure 5 except that pictures 46m are also provided on the reverse side of frames 36. Obviously, the use of the pictures 46m on the reverse side of the film strip 12m requires that the folds between the frames be bent in the opposite direction.

Now, an examination of Figures 1 and 2 will show that the magazine 24 is sized to receive the folded film strip 12 including the tabs 40; whereas, the aperture 22 is sized only slightly larger than the frames 36 and 38 but smaller than the frames 36 when considered with tabs 40 which are retained behind the overlapping portions 26 at the front of the magazine on opposite side edges of the aperture. The bias-cut edges 44 of the tabs 40 lie in the direction of pull of the film strip and prevent it from binding and becoming torn as it is pulled from the magazine through the aperture. The pull tab 42 projects through the aperture, as shown, and provides the means for withdrawing the strip from the magazine, toward the right as seen in Figure 1, at substantially right angles to the line of view. These tabs 40 provide one of the most important features of the invention as they retain the picture frames 36 within the viewer a greater length of time than the intermediate frames 38 thus exposing each animated drawing to the eyes of the viewer for as long as possible before it is changed. To produce the effect of animation by a series of pictures and also have the effect of persistence of vision, it is desirable to have the period of rest of each picture as long as possible with the period of motion of each picture as short as possible. The faster the period of motion as compared with the longer period of rest, the slower is the rate of pictures displayed that will produce the presistence of vision necessary to convey animation. The bias portion 44 of tab 40 enables the period of rest to be 20 to 30 times the period of motion and the necessary persistence of vision can be had for as low a rate as two frames per second.

As tension is applied to pull tab 42 in a direction approximately normal to the line of viewing or approximately parallel to the plane of the picture viewed, the tabbed picture frame 46, which is in viewing position, will move not only in the direction of pull but also along the line of viewing causing the next tabless frame 38 to be slightly bowed. The slight movement in the direction of pull is permitted by the bias cut 44 on the leading edges of the tabs 40. The bowing of the tabless frame produces a spring tension on the tab frame and as the pull is continued, the tabbed frame, on overcoming the resistance of the tabs, pivotally snaps out of the viewing aperture. The tab frame and the adjacent tabless frame will move rapidly to a position out of the line of view in relieving the bowed condition of the tabless frame. At this point the picture strip has moved only a comparatively short distance and the picture frame which was just viewed has completely cleared the space to allow the next picture to be viewed. The next picture frame 46 will remain in position for viewing for a period sufficient for the unfolding of frame 46 just viewed and the adjacent tabless frame 38 and until tension is applied to the next tabbed frame 46. The absence of tabs on the intermediate frames, of course, permits these frames to pass quickly through the aperture uncovering the following picture frame. The tabs retain the picture frames briefly in the aperture as they move to the front of the magazine; however, they fold rearward easily and permit the picture frame to pass through the aperture as the pull on the strip with the fingers continues. The spring 32 urges the film strip toward the aperture.

In the form shown, the magazine is loaded from the back after the outer section of the viewer has been removed; however, it can also be loaded from the front through the aperture by reversing the procedure by which it was withdrawn therefrom. If loaded from the front, the viewer and outer sections of the box need not be separated and can be formed integral with one another. Also, by arranging the drawings across the frames instead of in the direction of the length thereof, the strip can be drawn downwardly rather than to the right if the viewer is placed on its side.

Having thus described the many novel features of the film strip and viewer of the present invention, it will be seen that the several useful objects for which it was designed have been achieved. Although but two specific forms of the invention have been illustrated and described in connection with the accompanying drawing, I realize that certain changes and modifications may occur to those skilled in the art within the broad teaching found herein; hence, it is my intention that the scope of protection afforded hereby shall be limited only insofar as said limitations are expressly set forth in the appended claim.

What is claimed is:

An elongated strip folded into accordion-pleated form providing a plurality of substantially rectangular frames, alternate frames having tabs along the side edges thereof, and a plurality of pictures arranged from end to end of the strip on the tabbed frames to provide animation when viewed successively, the leading edges of said tabs being cut on a bias.

References Cited in the file of this patent

UNITED STATES PATENTS

| | | |
|---|---|---|
| 700,709 | Smith et al. | May 20, 1902 |
| 713,312 | Koopman | Nov. 11, 1902 |
| 1,010,228 | Buechner | Nov. 28, 1911 |
| 1,787,592 | Owens | Jan. 6, 1931 |
| 1,828,808 | Kimble | Oct. 27, 1931 |
| 1,994,340 | Feinen | Mar. 12, 1935 |
| 2,228,378 | Whitcomb | Jan. 14, 1941 |

FOREIGN PATENTS

| | | |
|---|---|---|
| 912,104 | France | Apr. 15, 1946 |
| 1,037,503 | France | Apr. 29, 1953 |
| 921,734 | Germany | Dec. 23, 1954 |